June 20, 1972 G. ODONE ET AL 3,671,127
LIGHT BEAM RANGE-FINDER
Filed Sept. 14, 1970
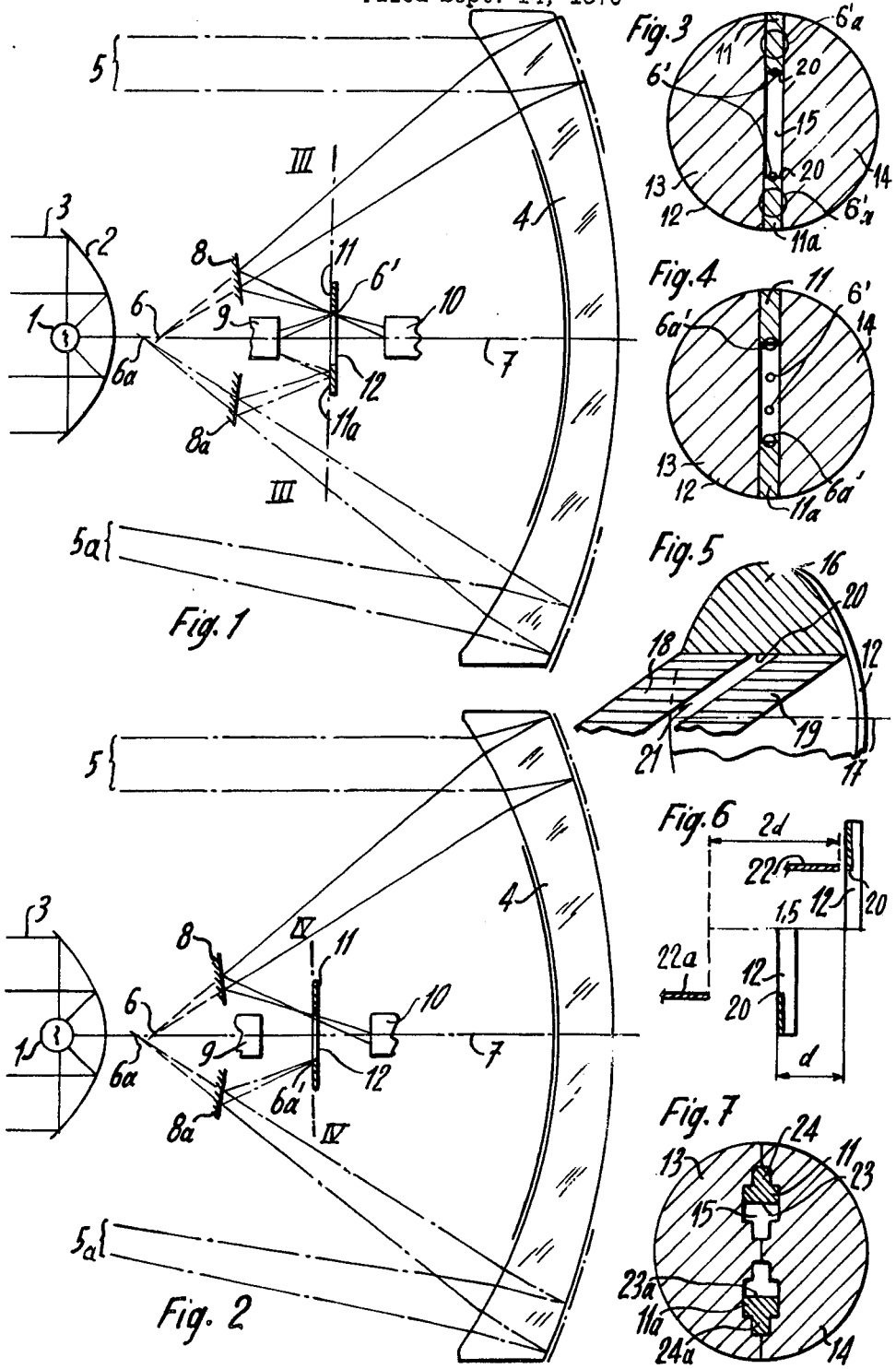
INVENTOR
GIOVANNI ODONE
CHRISTIAN LIETAR
BY Emery L. Groff Jr.
ATTORNEY

3,671,127
LIGHT BEAM RANGE-FINDER

Giovanni Odone, la Rosiaz S/Lausanne, and Christian Lietar, Yverdon, Switzerland, assignors to Paillard S.A., Sainte-Croix, Switzerland
Filed Sept. 14, 1970, Ser. No. 71,926
Claims priority, application Switzerland, Sept. 10, 1969, 15,233/69
Int. Cl. G01c 3/08
U.S. Cl. 356—4        6 Claims

ABSTRACT OF THE DISCLOSURE

A range-finder comprising a projector directing a light beam on the subject, the distance of which has to be measured, and an optical converging system collecting rays diffused by the luminous spot obtained on the subject and a photo-sensitive device for measuring the focusing distance of the collected rays. The photo-sensitive device comprises a movable screen having an edge adapted to separate the rays near the converging point to differentially direct them onto two photo-elements. Means are provided to prevent parasitic light rays to impinge on the photoelements.

---

The invention refers to a range-finder comprising a projector directing a light beam to form a luminous spot on a subject, the range or distance of which has to be measured, and an optical converging system collecting a part of the rays diffused by the luminous spot and making them converge substantially to a point towards a light-sensitive device, offering at least one edge of separation, adapted to be moved about in the locus of the converging points of the collected rays, in order to determine their focusing distance which is a function of the range of the subject.

In the range-finders of this type, the sensitivity of the measuring device is diminished by parasitic rays reaching the light-sensitive device. The device generally comprises one or several photoconductors and it is evident that these react as well to useful signals as to parasitic ones. In general, the beam produced by the propector, a light beam that need not necessarily fall within the visible spectrum, is modulated in such a way as to permit distinction of useful rays and parasitic rays among the rays collected by the optical converging system. In spite of that, the parasitic light constitutes a sort of "noise" which diminishes the response of the photosensitive device to the modulated light.

The object of the present invention is to permit a substantial diminution of the harmful effects of the parasitic light in the range-finders of the afore-mentioned type. This result is obtained by the fact that the range-finder comprises a screen located in the proximity of the locus of the converging points of said rays and presenting at least one aperture providing a passage for the convergent rays due to the luminous spot on the subject, while said screen protects the light-sensitive device at least partially against parasitic light rays.

The attached drawing represents, schematically and by way of example, one embodiment and three modifications of the subject of the invention.

FIG. 1 is a schematical section of a range-finder to illustrate its operation.

FIG. 2 is a view similar to FIG. 1, showing another position of operation.

FIGS. 3 and 4 are views taken along lines III—III and IV—IV of FIGS. 1 and 2, and show the separator device for the two different operative conditions.

FIG. 5 illustrates a modification of this separator.

FIG. 6 illustrates another modification of the separator device.

FIG. 7 refers to the third modification.

As shown in FIG. 1, the range-finder comprises a projector with a lamp 1 and a parabolic reflector 2 for directing the beam 3 of substantially parallel rays onto the subject, not shown in the figure, and the distance of which is to be measured. In principle, the lamp 1 could be of the incandescent type, fed by a current pulsating at a relatively low frequency, for example of the order of 10 Hz., so as to produce a modulated light beam. By light beam, it is meant any beam of rays of the nature of light, whether these rays fall within the visible spectrum or not. In practice, it has been found very useful to employ infrared rays in the range-finder of this type.

The luminous spot produced on the subject, the distance of which is to be measured, diffuses rays, some of which are directed nearly along the optical axis of the projector and are collected by an optical converging system constituted by a mirror 4. This mirror is constituted by a diametral slice of a spherical mirror.

The light rays 5 are supposed to originate from an object located substantially at infinity and have been represented only in the upper part of the drawing, in order to permit illustration, in the lower part, of the path of rays 5a issuing from a near object, which could, for example, be one or two meters away. The rays 5 will come and converge to a point 6 situated on the optical axis 7 of the mirror 4, if they were not reflected by a plane mirror 8 slightly inclined with respect to a plane perpendicular to the axis 7, in such a way that the rays 5 come and converge to a point 6′.

The range-finder comprises a photo-sensitive device composed of two photoconductors 9 and 10 located on two sides of a seperator device comprising a reflecting surface 11, of which the edge 20 constitutes an edge of separation, which could be brought to coincide with the focusing point 6′ of the rays. In this position, a part of the rays is not intercepted and comes to strike the photoconductor 10, while the other part of the beam is reflected towards the photoconductor 9. The equality of illumination of the photoconductors 9 and 10 then indicates that the edge of separation coincides very accurately with the focusing point 6′ of the rays 5.

To get the edge of separation to coincide with the focusing point of rays, the reflecting surface 11 of the separator device is mounted on a support, not shown in the figure, allowing it to move along the optical axis 7. This support carries at the same time the mirrors 8 and 8a.

The reflecting surface 11 occupies, in FIG. 1, the position of separation for the rays coming from infinity. As shown, the rays 5a, which emanate from the luminous spot, in the case when the object receiving the rays 3 is near, have a focusing point located at 6a. However, these rays are reflected by a surface 8a and reach the reflecting surface 11a in such a way that they are completely reflected towards the photoconductor 9 and do not reach the photoconductor 10.

To determine the distance of the object diffusing the rays 5a, it is necessary to displace the surface 11a towards the left of FIG. 1 until one-half of the rays received come to strike the photoconductor 10, the equality of illumination being then obtained between the two photoconductors.

Of course, the surfaces 11 and 11a are mounted on a single movable support and are preferably constituted by the reflecting surfaces prepared on a blade of glass. In practice, the upper and the lower parts of the mirror 4 will receive at the same time the rays emanating from an object situated at a given distance and the case illustrated in the figure will not arise, this case being simply for the purpose of explaining the arrival at the mirror 4 at the same time, of rays 5 coming from infinity and rays 5a originating from an object situated at a short distance, these rays being of course the diffused rays originating from the luminous spot formed by the beam 3.

FIG. 2 is analogous to FIG. 1, but the reflecting surface 11 and the mirrors 8 and 8a occupy the position of separation for the rays originating in a near object, situated, for example, at a distance of 1.5 meter. As in FIG. 1, rays 5 have been shown and are supposed to have been reflected by a distant object, so that these rays are practically parallel to the optical axis 7 and also shown are the rays 5a which are the ones diffused, starting from the luminous spot produced by the projector on an object 1.5 meter away from the range-finder. The rays 5a converge to a point 6'a coincident with the edge of separation, so that they are divided equally between the photoconductors 9 and 10. On the other hand, the rays 5, after reflection from the mirror 8, do not strike the reflecting surface 11 and are, therefore, all directed onto the photoconductor 10.

FIG. 3 shows the reflecting surfaces 11 and 11a in front view. These surfaces are provided on a blade of glass 12. In order to diminish the effect of parasitic rays, this blade of glass comprises a screen formed by two opaque surfaces 13 and 14, letting between them a slot 15. This slot 15 is located along the region of the convergent point of the reflected rays collected by the mirror 4. The result is that most of the parasitic rays will come to strike the surfaces 13 and 14 which are opaque and non-reflecting. These rays cannot thus reach the photoconductors 9 and 10, with the result that their response curve is excellent, for it is not influenced infavourably by the parasitic rays.

In FIG. 3, which corresponds with the case illustrated in FIG. 1, 6' indicates the two spots formed by the rays of the projector of the range-finder, which are reflected by an object very far away from the range-finder. Due to this remoteness, the image of the luminous spot is very small and the luminous intensity of the rays received is relatively low.

The FIG. 3 also shows by a circle designated as 6'a the spot that would be formed by the rays 5a sent back by an object located at a short distance from the range-finder. These rays are received by the surfaces 11 and 11a prior to their point of convergence. They form, thus, a spot of a diameter relatively large, on the one hand because of the nearness of the object which gives a larger image of the spot, and on the other hand because of the lack of sharpness of the image formed, as the surfaces 11 and 11a are not in the plane of focus. Due to the relatively small distance between the range-finder and the object, the luminous intensity of these rays is much greater than that in the case of the rays sent back by a distant object.

FIG. 4 is a view analogous to FIG. 3, but illustrates the case where the blade 12 is in a position ensuring the separation of the rays sent back by an object at a distance of 1.5 meter from the range-finder (case of FIG. 2). In this case, the rays 5a sent back by the object form the two spots designated as 6'a, which are the image of the luminous spot produced on the object by the rays 3 of the projector. Due to the short distance of the object, the diameter of these spots is larger than that of the spots 6' of FIG. 3.

FIG. 4 also shows the spots which would be obtained by the rays sent back by a distant object when the blade 12 is in a position giving an equality of illumination between the photoconductors 9 and 10, for a near object. In this case, the rays 5, supposed to have originated in a distant object, form the spots 6' passing into the slot 15. As the rays 5 are intercepted outside their point of convergence, the diameter of these spots is a little larger than that of the spots 6' of FIG. 3.

FIG. 5 illustrates a modification in which the blade 12 has two reflecting portions, of which only the upper portion 16 is shown in the figure.

The screen comprises two opaque non-reflecting surfaces 18 and 19 of the blade 12 and situated in a plane substantially perpendicular to this blade. In this manner, the edge of separation is constituted by the small portion 20 of the edge of the surface 16, facing the slot 21, which is bounded by the opaque surfaces 18 and 19. In this manner, the rays striking one or the other of the photoconductors 9 and 10 must necessarily pass into the slot 21. Of course, in its lower part, the blade 12 presents a second reflecting surface and a second opaque and non-reflecting surface, which are symmetrical in relation to reflecting surface 16 and the opaque surfaces 18 and 19, with respect to a symmetry plane perpendicular to the blade 12 and containing the axis 17.

FIG. 6 refers to a modification in which the blade 12 corresponds to that of FIG. 3, but which comprises besides for every reflecting surfaces 11 and 11a a supplementary mask 22 and 22a which let pass only about 10% of the light. These masks extend perpendicularly to the blade 12 like the surfaces 18 and 19 of FIG. 5. Besides, the masks are movable in relation to the blade 12 depending on the position of the latter, i.e. as a function of the distance over which the edge of separation is adjusted. It will be seen that for long distances, the masks are very close to the blade 12, as illustrated for mask 22, whereas for short distances, for example of the order of 1.5 meter, the masks are relatively distant from the blade 12, as shown for mask 22a. It is clear that the displacement of the masks could be obtained easily by a mechanism linked with the movement of the blade 12 and giving to the mask 22 an equal displacement but in a direction opposite to that of blade 12. In principle, the displacement of the latter is controlled by a servomotor operated by the electrical signal furnished by the photoconductors 9 and 10.

The reason for having this variable displacement is that when the blade 12 is at a position approximately corresponding to infinity and that the object sends back the light from a short distance, the intensity of the light sent back is relatively high, so that 10% of this light which passes through the mask 22 is sufficient to cause a change in the illumination of the photoconductor 9 for giving a signal acting on the focusing servomotor. On the other hand, if the blade occupies a position close to the focus and the object is at a distance relatively large, for example 5 to 10 meters, the intensity of the beam sent back is low, and the 10% of this intensity would not be sufficient to excite the photoconductor 10 for operating the servomotor. On account of the space between the masks and the blade 12 in the position 22a, a large part of the reflected beam, and in certain cases even the entire beam, can reach the photoconductor 10 which is then sufficiently excited for the servomotor to react and bring the blade 12 in the position desired, while at least a part of the parasitic light is cut by the masks.

The modification illustrated in FIG. 7 corresponds appreciably to the form of construction as per FIGS. 3 and 4. One finds again the reflecting surfaces 11 and 11a, as well as the opaque surfaces 13 and 14, and the transparent slot 15. However, the opaque surfaces 13 and 14 have a form such that the central part of the slot is covered and that this slot offers a width appreciably smaller near the central covered part than that near the line of separation formed by the edges 23 and 23a of the reflecting surface. Likewise, the portions 24 and 24a respectively of the reflecting surfaces, which are away from the edge of separation, offer a reduced width.

This arrangement follows directly from the explanation given in reference to FIGS. 3 and 4. Indeed, referring to FIG. 4, one sees that no useful light ray enters the slot 15 between the two spots 6', with the result that this portion could be opaque. Moreover, the spots 6' have a diameter relatively small, so that the slot 15 could be narrow without hindering the passage of these rays. At the level of the edge of separation, it is preferable that the width of the slot be sufficient to allow the reception of all the rays sent back by a near object and forming the spot designated as 6'a in FIG. 4.

As for the narrow portions 24 and 24a of FIG. 7, these are rendered possible on account of the fact that in the case of FIG. 3, the intensity of the rays reflected by a near object and forming the spot 5'a is much greater than that of the rays reflected by a distant object and converging at 6'. It is thus not necessary to utilize all the energy of the rays forming the spot 6'a for efficiently acting on the servo-mechanism.

It is clear that the same effect could be obtained by providing a semi-transparent surface blocking a portion of the slot, its portion nearest to the edge of separation being partially covered with a semi-transparent surface, i.e. a light absorbing material, the denstiy of which progressively increases as a function of its distance to the separating edge 23.

We claim:

1. A range-finder comprising a projector directing a light beam on a subject, the distance of which has to be measured, to form a luminous spot thereon, said spot diffusing rays, an optical converging system collecting a part of the rays diffused by said spot and making them to converge substantially in a focusing point, a movable screen having an edge adapted to differently separate the converging rays substantially at said focusing point into at least two parts, as a function of the position of said movable screen relatively to said focusing point, photo-elements adapted to respectively receive said parts of separate rays, wherein the improvement consists in the provision of screen means preventing parasitic light rays to impinge on said photo-elements.

2. A range-finder according to claim 1, wherein said screen means is secured to said movable screen.

3. A range-finder according to claim 1, wherein said screen means is carried by a movable support, the displacement of which relative to said screen are a function of the displacement of said screen.

4. A range-fiinder according to claim 1, wherein said screen means consists in a support having an aperture forming a passage for said converging rays.

5. A range-finder according to claim 4, wherein said aperture consists in a slot, the width of which is larger near the separating edge than remote from this edge.

6. A range-finder according to claim 4, wherein the aperture of said screen means support consists in a slot in an opaque part of said support, said slot being partially covered with a semi-transparent surface, the density of which progressively increases as a function of its distance to the edge of separation.

References Cited

UNITED STATES PATENTS

| 3,143,588 | 8/1964 | Donald et al. | 356—4 |
| 3,037,423 | 6/1962 | Shurcliff | 250—204 |

FOREIGN PATENTS

| 449,985 | 4/1968 | Switzerland. |

BENJAMIN A. BORCHELT, Primary Examiner

S. BUCZINSKI, Assistant Examiner

U.S. Cl. X.R.

356—5; 250—204

UNITED STATES PATENT OFFICE
CERTIFICATE OF CORRECTION

Patent No. 3,671,127            Dated June 20, 1972

Inventor(s) GIOVANNI ODONE and CHRISTIAN LIETAR

It is certified that error appears in the above-identified patent and that said Letters Patent are hereby corrected as shown below:

Column 1, line 7, change "Sept. 10, 1969" to

--Oct. 10, 1969--.

Signed and sealed this 9th day of January 1973.

(SEAL)
Attest:

EDWARD M. FLETCHER, JR.          ROBERT GOTTSCHALK
Attesting Officer                    Commissioner of Patents